(12) United States Patent
Ko et al.

(10) Patent No.: US 10,236,948 B2
(45) Date of Patent: Mar. 19, 2019

(54) MIMO SYSTEMS WITH INDEPENDENT OSCILLATORS AND PHASE NOISE MITIGATION METHOD THEREOF

(71) Applicant: Korea University Research and Business Foundation, Seoul (KR)

(72) Inventors: Young Chai Ko, Seoul (KR); Tae Jun Lee, Gyeonggi-do (KR); Byung Ju Lim, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 15/795,820

(22) Filed: Oct. 27, 2017

(65) Prior Publication Data

US 2018/0123652 A1    May 3, 2018

(30) Foreign Application Priority Data

Oct. 27, 2016 (KR) ........................ 10-2016-0141308
Jul. 18, 2017 (KR) ........................ 10-2017-0091195

(51) Int. Cl.
| | |
|---|---|
| *H04B 7/0413* | (2017.01) |
| *H04J 11/00* | (2006.01) |
| *H04L 1/00* | (2006.01) |
| *H04L 25/02* | (2006.01) |

(52) U.S. Cl.
CPC ........ *H04B 7/0413* (2013.01); *H04J 11/0023* (2013.01); *H04L 1/0054* (2013.01); *H04L 1/0055* (2013.01); *H04L 25/02* (2013.01)

(58) Field of Classification Search
CPC ...... H04B 7/0413; H04B 17/336; H04B 1/10; H04B 15/00; H04B 1/0475; H04B 7/0452; H04L 25/0202; H04L 1/0054; H04L 1/0055; H04L 25/02; H04J 11/0023
See application file for complete search history.

(56) References Cited

U.S. PATENT DOCUMENTS

| | | | | |
|---|---|---|---|---|
| 9,374,143 | B2* | 6/2016 | Giannakis | .............. H04B 7/046 |
| 2010/0304770 | A1* | 12/2010 | Wietfeldt | .......... H04W 72/1215 455/509 |
| 2011/0255572 | A1* | 10/2011 | Giannakis | ........... H04L 25/0206 375/146 |
| 2017/0311307 | A1* | 10/2017 | Negus | ................... H04W 52/42 |

FOREIGN PATENT DOCUMENTS

KR    2005-0067343 A    7/2005

* cited by examiner

*Primary Examiner* — Khanh C Tran
(74) *Attorney, Agent, or Firm* — Fox Rothschild LLP

(57) ABSTRACT

Disclosed is a phase noise mitigation method using a MIMO system in which each antenna has an independent oscillator. The phase noise mitigation method includes: receiving a transmission signal transmitted from a transmitting antenna, through a receiving antenna and an oscillator; estimating multiple parameters for a phase noise of a transmission terminal and a phase noise of a receiving terminal on the basis of a result of mathematical modeling of signals transmitted and received through the MIMO system in which each antenna has an independent oscillator; and mitigating phase noises of the transmission terminal and the receiving terminal which are estimated from the received signal.

10 Claims, 8 Drawing Sheets

FIG. 6

Algorithm 1 Joint Data symbol and Phase Noise Estimation

Initialize $\tilde{x}^{(0)}, \tilde{\theta}^{(0)}, \tilde{\phi}^{(0)}, k=0$ and $e^{(0)} = \infty$
Repeat
1. Find out $\tilde{x}^{(k+1)}$
   - Multiply $y$ by $\tilde{\phi}^{(k)*}$.
   - After DFT operation, Equalize CFR.
   - Multiplying equlized datas by circulant matrix of $DFT\{(\tilde{\theta}_i)^*\}$ each TX ends, find out $\tilde{s}_i^{(k+1)}$ and $\tilde{x}^{(k+1)}$ 2. Using (12) with $\tilde{x}^{(k+1)}$ and $\tilde{\phi}^{(k)}$, update $\tilde{\theta}^{(k+1)}$.
3. Using (13) with $\tilde{x}^{(k+1)}$ and $\tilde{\theta}^{(k+1)}$, update $\tilde{\phi}^{(k+1)}$.
4. $e^{(k+1)} = \sum_{i=1}^{N_t} \sum_{q \in S_p} \left\| \tilde{s}_i^{(k+1)}(q) - s_i(q) \right\|^2$.
5. $k = k + 1$
Until $e^{(k+1)} > e^{(k)}$, and return $\tilde{s}^{(k)}$

MIMO SYSTEMS WITH INDEPENDENT OSCILLATORS AND PHASE NOISE MITIGATION METHOD THEREOF

CROSS-REFERENCE TO RELATED APPLICATION

This application claims the benefit under 35 USC 119(a) of Korean Patent Application No. 10-2016-0141308 filed on Oct. 27, 2016 and Korean Patent Application No. 10-2017-0091195 filed on Jul. 18, 2017, in the Korean Intellectual Property Office, the entire disclosures of which are incorporated herein by reference for all purposes.

TECHNICAL FIELD

The present disclosure relates to a wireless communication system, and more particularly to a multiple-input multiple-output (MIMO) system that processes an algorithm for mitigating a phase noise generated in a wireless communication system and a phase noise mitigation method thereof.

BACKGROUND

Recently, in a MIMO system, there is a tendency to increase a distance between antennas to obtain a better channel environment. In particular, conventionally, an oscillator has been shared by antenna stages of a MIMO system, as shown in FIG. 1. However, recently, due to the problem in implementing a RF circuit occurring when a superhigh frequency is used, independent oscillators have been increasingly used by the respective antenna stages as shown in FIG. 2.

Meanwhile, a phase noise refers to a noise caused by nonideal characteristics of an oscillator and is in the form of random process. Such a phase noise is independently generated from each oscillator. If independent oscillators are used by antenna stages, respectively, the number of phase noises affecting a system is increased in proportion to the number of antennas. That is, performance degradation caused by a phase noise may be increased in this system as compared to a conventional system in which a common oscillator is used by antenna stages.

Specifically, a phase noise generated from a RF stage by nonideal characteristics of an oscillator greatly affects the performance of an orthogonal frequency division multiplexing (OFDM) system. The phase noise may cause performance degradation in the form of a common phase error (CPE) and an inter-carrier interference (ICI). Particularly, the common phase error more greatly affects the performance degradation. Therefore, conventionally, studies on the estimation of a common phase error have been actively conducted.

In this regard, Korean Patent Laid-open Publication No. 10-2003-0098224 (entitled "An apparatus for phase noise suppression in the wireless LAN system, and a method thereof") suggests a common phase error correction algorithm for the case where a phase error is present and an algorithm for reducing an inter-carrier interference. Herein, the common phase error correction algorithm is extended from a least square algorithm. However, this conventional phase noise mitigation method is limited in that it is based on the assumption that only a single antenna is used.

As for a multiple-antenna system in which each antenna stage has an independent oscillator, phase noises are generated in proportion to the number of antennas, resulting in severe performance degradation. However, an algorithm for mitigating the phase noises in this system has hardly been studied. That is, the conventional least square algorithm can estimate only a common phase error among the effects of phase noises, and if only the common phase error is compensated, performance improvement may be expected at a low SNR power but cannot be expected at a high SNR power. In this case, a bit error rate (BER) graph can also confirm that an error-floor phenomenon occurs at a high SNR.

Accordingly, there is a need for a phase noise mitigation method capable of reducing not only a common phase error but also an inter-carrier interference caused by phase noises in a MIMO-OFDM system in which each antenna stage has an independent oscillator.

SUMMARY

In view of the foregoing, the present disclosure provides a MIMO system in which each antenna stage has an independent oscillator and which can estimate and mitigate phase noises, and a phase noise mitigation method thereof.

However, problems to be solved by the present disclosure are not limited to the above-described problems. There may be other problems to be solved by the present disclosure.

According to a first aspect of the present disclosure, a phase noise mitigation method using a MIMO system in which each antenna has an independent oscillator includes: receiving a transmission signal transmitted from a transmitting antenna, through a receiving antenna and an oscillator; estimating multiple parameters for a phase noise of a transmission terminal (or a transmission-end) and a phase noise of a receiving terminal (or receiving-end) on the basis of a result of mathematical modeling of signals transmitted and received through the MIMO system in which each antenna has an independent oscillator; and mitigating phase noises of the transmission terminal and the receiving terminal which are estimated from the received signal. Herein, the estimating of multiple parameters includes: repeatedly and alternately computing relations for the phase noises of the transmission terminal and the receiving terminal; and if an error value obtained from a result of the repeated computations is greater than an error value obtained from a previous repetition step, stopping the repeated computations and outputting data calculated in the previous repetition step.

According to a second aspect of the present disclosure, a MIMO system in which each antenna has an independent oscillator includes: multiple receiving antennas; multiple oscillators connected to the multiple receiving antennas, respectively; a memory configured to store a program for mitigating phase noises of a receiving terminal and a transmission terminal from a signal received through a receiving antenna and an oscillator; and a processor configured to execute the program. Herein, upon execution of the program, the processor estimates multiple parameters for a phase noise of a transmission terminal and a phase noise of a receiving terminal on the basis of a result of mathematical modeling of signals transmitted and received through the MIMO system and mitigates phase noises of the transmission terminal and the receiving terminal which are estimated from the signal received through the receiving antenna and the oscillator. Herein, the estimation of multiple parameters is performed by repeatedly and alternately computing relations for the phase noises of the transmission terminal and the receiving terminal, and if an error value obtained from a result of the repeated computations is greater than an error value obtained from a previous repetition step, stopping the repeated computations and outputting data calculated in the previous repetition step.

In some scenarios, all of phase noises generated in a MIMO system in which each antenna stage has an independent oscillator are estimated, and, thus, it is possible to mitigate not only a common phase error but also an inter-carrier interference caused by phase noises.

Further, in those or other scenarios, the bit error rate (BER) performance can be greatly improved as compared to a conventional phase noise mitigation method using a least square algorithm only, and if pilot subcarriers are sufficient in number, the performance improvement can be achieved even in a system including multiple antennas.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 6 illustrates an outline of the regression computation algorithm.

DETAILED DESCRIPTION

Figure 1:
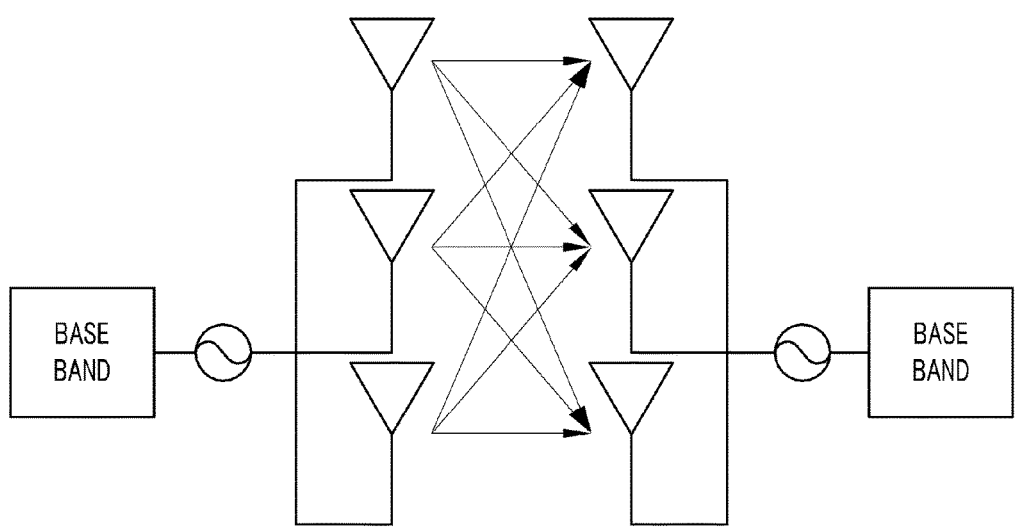
FIG. 1 is a schematic diagram illustrating a configuration of a conventional MIMO system using a common oscillator.
Figure 2:
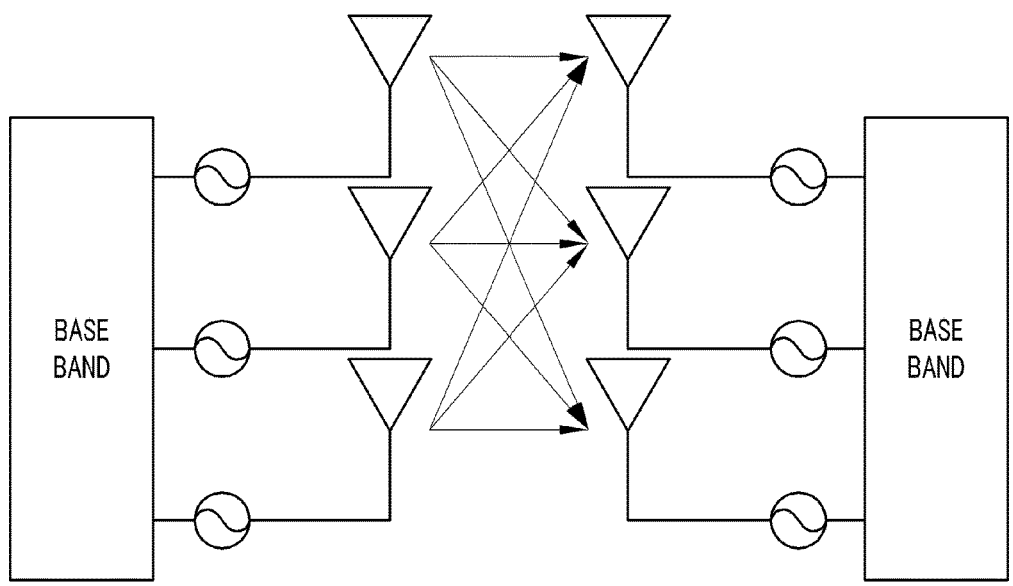
FIG. 2 is a schematic diagram illustrating a configuration of a conventional MIMO system using independent oscillators.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, it is to be understood that the term "comprises or includes" and/or "comprising or including" used in the document means that one or more other components, steps, operation and/or existence or addition of elements are not excluded in addition to the described components, steps, operation and/or elements unless context dictates otherwise.

Through the whole document, the term "unit" or "module" includes a unit implemented by hardware or software and a unit implemented by both of them. One unit may be implemented by two or more pieces of hardware, and two or more units may be implemented by one piece of hardware.

Hereinafter, a MIMO system in which each antenna stage has an independent oscillator and a phase noise mitigation method thereof will be described in detail with reference to the accompanying drawings. For reference, in some scenarios, a technology related to channel estimation is not much relevant to the core technology of the present disclosure. Thus, it is assumed that channels are already known.

Figure 3:
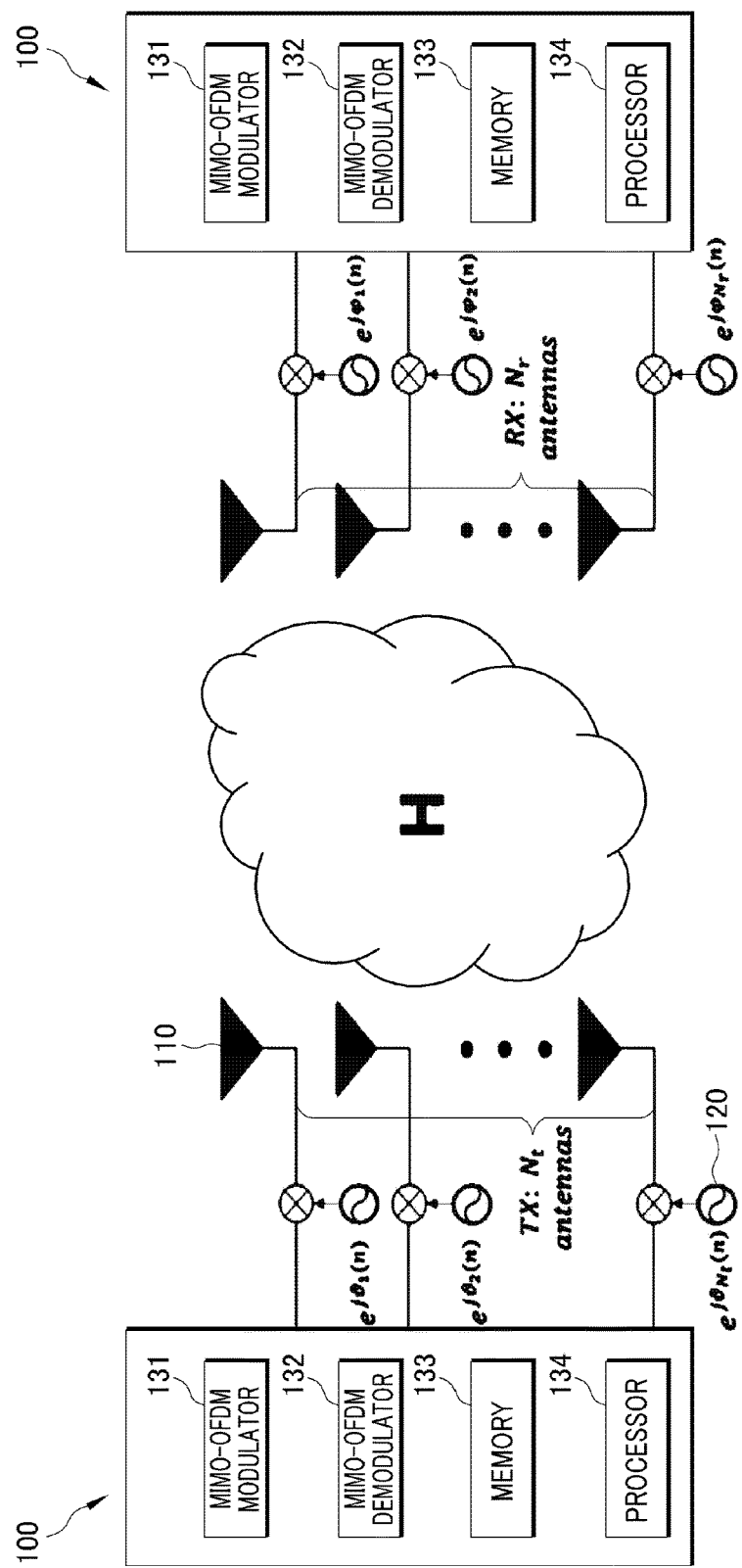
FIG. 3 is a configuration diagram of a MIMO system including independent oscillators.

FIG. 3 is a configuration diagram of a MIMO system.

As illustrated in FIG. 3, it is assumed that a MIMO system 100 is a wireless communication system using multiple antennas 110. Further, the MIMO system 100 has an independent oscillator structure in which each transmission terminal (transmission-end)/receiving terminal (receiving-end) antenna 110 has an oscillator 120, and includes a MIMO-OFDM modulator 131, a MIMO-OFDM demodulator 132, a memory 133, and a processor 134.

The transmission terminal/receiving terminal antenna 110 is configured to transmit a signal processed by the MIMO-OFDM modulator 131/demodulator 132 to the outside under the control of the processor 134 or receive a wireless signal from the outside to transfer the wireless signal to the MIMO-OFDM modulator 131/demodulator 132. The oscillators 120 connected to the respective antennas function to perform up- and/or down-conversion of a subcarrier frequency.

The MIMO-OFDM modulator 131 performs a modulation process of modulating data to a signal to be transmitted through each antenna 110 under the control of the processor 134. In this case, the modulation process may be performed in various ways. For example, the MIMO-OFDM modulator 131 may modulate signals using a polarity multiplexing MIMO method in which a polarity is applied to a signal to be transmitted according to a code of channel correlation to be transmitted through each antenna, but may not be limited thereto.

The MIMO-OFDM demodulator 132 performs a demodulation process of converting signals input through the receiving antenna 110 and the oscillator 120 into signals in a frequency range under the control of the processor 134. In this case, the demodulation process may be a process of inversely performing the modulation process.

The memory 133 stores one or more programs (or instructions) for controlling the modulation process or the demodulation process. Further, the memory 133 stores a program for removing phase noises of a receiving terminal and a transmission terminal from signals received through the receiving antenna 110 and the oscillator 120. Meanwhile, the memory 133 may collectively refer to a non-volatile storage device that retains information stored therein even when power is not supplied and a volatile storage device that requires power to retain information stored therein.

The processor 134 may be implemented as including one or more components for controlling the MIMO system 100. Further, the processor 134 may perform the modulation process or demodulation process of modulating or demodulating signals transmitted and received through the MIMO system 100 by executing a program stored in the memory 133. Particularly, the processor 134 may remove phase noises generated from the oscillators of the transmission terminal and the receiving terminal after the demodulation process by executing the program stored in the memory 133 and thus improve a phase error correction function of the MIMO system 100. Hereinafter, details thereof will be described with reference to FIG. 4.

Figure 4:
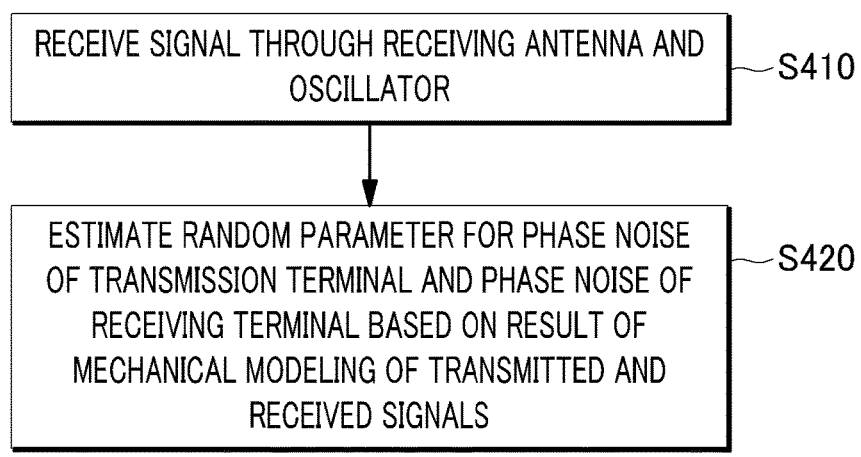
FIG. 4 is a flowchart provided to explain a method of mitigating a phase noise of the MIMO system by the processor illustrated in FIG. 3.

FIG. 4 is a flowchart provided to explain a method of mitigating a phase noise of the MIMO system 100 by the processor 134.

Firstly, the processor 134 may receive a transmission signal for data transmitted from a transmitting antenna through a receiving antenna and an oscillator (S410).

Then, the processor 134 may estimate multiple parameters for a phase noise of a transmission terminal and a phase noise of a receiving terminal on the basis of a result of mechanical modeling of signals transmitted and received through the MIMO system 100 (S420).

Hereinafter, the mechanical modeling of signals transmitted and received through the MIMO system 100 will be described.

Firstly, data, to be transmitted from an ith transmission terminal antenna are inverse discrete Fourier transformed (IDFT), and then, an OFDM signal (i.e., transmission signal) transmitted from a time domain can be expressed by the following Equation 1.

$$x_i[n] = \frac{1}{N}\sum_{k=0}^{N-1} s_i[k]e^{j2\pi kn} \quad \text{[Equation 1]}$$

The transmission signal in Equation 1 is affected by a channel and a phase noise of the transmission terminal, and a signal to be received by a jth receiving antenna can be expressed by the following Equation 2.

$$y_j[n] = \sum_{i=1}^{N_t} x_i[n]e^{j\theta_i[n]} \otimes h_{ij}[n]e^{j\phi_j[n]} + w_j[n] \quad \text{[Equation 2]}$$

In Equation 2, $\theta_i$ and $\phi_j$ represent phase noises of an ith transmission terminal and a jth receiving terminal, respectively, $w_j$ represents a Gaussian noise of the jth receiving terminal, and $\otimes$ represents a circulant convolution. Further, $h_{ij}$ represents a channel between an ith transmission terminal antenna and a jth receiving terminal antenna. Furthermore, $N_t$ and $N_r$ represent antenna numbers of a transmission terminal and a receiving terminal, respectively.

If the received signal in Equation 2 is represented as a vector, Equation 2 can be expressed as shown in the following Equation 3.

$$y = P_{\phi,D} F_{N_r,D}{}^H H F_{N_r,D} P_{\theta,D} x + w \quad \text{[Equation 3]}$$

The letters in Equation 3 represent vector forms of the respective letters, and the small letters represent vectors and the capital letters represent matrices. Further, each letter in Equation 3 can be defined as shown in Equation 4.

$$y_j = [y_j(0), y_j(1), \ldots, y_j(N-1)]^T, \quad \text{[Equation 4]}$$

$$y = [y_1^T, y_2^T, \ldots, y_{N_r}^T]^T$$

$$x_i = [x_i(0), x_i(1), \ldots, x_i(N-1)]^T,$$

$$x = [x_1^T, x_2^T, \ldots, x_{N_t}^T]^T$$

$$w_j = [w_j(0), w_j(1), \ldots, w_j(N-1)]^T,$$

$$w = [w_1^T, w_2^T, \ldots, w_{N_r}^T]^T$$

-continued $$\phi_j = [\phi_j(0), \phi_j(1), \ldots, \phi_j(N-1)]^T,$$

$$\phi = [\phi_1^T, \phi_2^T, \ldots, \phi_{N_r}^T]^T, \quad p_\phi = \exp\{j\phi\},$$

$$P_{\phi,D} = \text{diag}(p_\phi)$$

$$\theta_i = [\theta_i(0), \theta_i(1), \ldots, \theta_i(N-1)]^T,$$

$$\theta = [\theta_1^T, \theta_2^T, \ldots, \theta_{N_t}^T]^T, \quad p_\theta = \exp\{j\theta\},$$

$$P_{\theta,D} = \text{diag}(p_\theta)$$

$$h_{ij} = [h_{ij}(0), h_{ij}(1), \ldots, h_{ij}(N-1)]^T,$$

$$H_{ij,D} = \text{diag}(h_{ij}),$$

$$H = \begin{bmatrix} H_{11,D} & H_{12,D} & \ldots & H_{1N_t,D} \\ H_{21,D} & H_{22,D} & \ldots & H_{2N_t,D} \\ \vdots & \vdots & \ddots & \vdots \\ H_{N_r1,D} & H_{N_r2,D} & \ldots & H_{N_rN_t,D} \end{bmatrix}$$

$$F_{N_r,D} = \text{diag}(\underbrace{[F, F, \ldots, F]}_{N_r})$$

In Equation 3, F represents a normalized discrete Fourier transform (DFT) matrix and diag is an operator that converts a vector into a diagonal matrix and also converts matrices having the same size into a block diagonal matrix. Also, h represents a channel, $\theta$ represents a phase noise of a transmission terminal, and $\phi$ represents a phase noise of a receiving terminal.

Since probabilistic characteristics can be seen from the qualification of an oscillator in most cases, it is assumed that probability distribution of phase noises is already known in scenarios of the present solution. Meanwhile, phase noises follow the Gaussian distribution in most cases. Thus, if a phase noise generated from the jth receiving terminal follows the distribution of $\phi_j \sim N(0,\Phi_j)$, all of phase noises generated from the respective oscillators are independent of each other. Therefore, a phase noise generated from a receiving terminal can be expressed by the following Equation 5.

$$\phi \sim N(0,\Phi), \Phi = \text{diag}([\Phi_1, \Phi_2, \ldots, \Phi_{N_r}]) \quad \text{[Equation 5]}$$

Also, it can be said that a phase noise generated from a transmission terminal follows the distribution as expressed by the following Equation 6.

$$\theta \sim N(0,\Theta), \Theta = \text{diag}([\Theta_1, \Theta_2, \ldots, \Theta_{N_t}]) \quad \text{[Equation 6]}$$

The processor 134 may estimate parameters for phase noises of the transmission terminal/receiving terminal on the basis of the above-described system model. In this case, the processor 134 may use a MAP (Maximum A Posterior) estimation method to efficiently estimate more parameters from a limited signal.

Specifically, a log likelihood (LLF) function about $\phi$ (phase noise of the transmission terminal) and $\theta$ (phase noise of the receiving terminal) which are parameters to be estimated can be expressed by the following Equation 7.

$$L(\phi,\theta) = -\ln p(y|\phi,\theta) - \ln p(\phi) - \ln p(\theta) \quad \text{[Equation 7]}$$

The processor 134 may apply the MAP estimation method to calculate $\phi$ and $\theta$ $$\left(\text{i.e., } \{\hat{\phi}_{MAP}, \hat{\theta}_{MAP}\} = \max_{\phi,\theta} L(\phi, \theta)\right)$$

that maximize the LLF function of Equation 7, which may be a process of performing a partial differentiation to each of $\phi$ and $\theta$ and as parameters for estimating the LLF function and extracting $\phi$ and $\theta$ that make the partially differentiated function o.

Prior to this, Equation 3 can be simplified as shown in the following Equation 8.

$$y = \Xi p_\theta + w = \Lambda p_\phi + w \quad \text{[Equation 8]}$$

In the above equation, $\Xi$ represents $\Xi = P_{\phi,D} F_{N_r,D}{}^H H F_{N_r,D} X_D$ and $\Lambda$ represents.

Further, Equation 7 can be expressed as shown in the following Equation 9 using Equations 5, 6, and 8.

$$L(\phi, \theta) = \frac{1}{\sigma_{w_e}^2}(y - \Xi p_\theta)^H (y - \Xi p_\theta) + \frac{1}{2}\phi^T C_\phi^{-1} \phi + \frac{1}{2}\theta^T C_\theta^{-1} \theta \quad \text{[Equation 9]}$$

$$= \frac{1}{\sigma_{w_e}^2}(y^H y - 2R\{p_\theta^H \Xi^H y\} + p_{e\theta}^H \Xi^H \Xi p_\theta) -$$

$$\frac{1}{2}\phi^T C_\phi^{-1} \phi + \frac{1}{2}\theta^T C_\theta^{-1} \theta$$

In general, a phase noise is very small and thus can be expressed as $\exp(j\theta) \approx 1 + j\theta$ by the Taylor's series. Therefore, Equation 9 can be expressed in another way as shown in the following Equation 10.

$$L(\phi, \theta) = \frac{1}{\sigma^2} y^H y - \frac{2}{\sigma^2} \text{Re}\{(1^T - j\theta^T)\Xi^H y\} + \quad \text{[Equation 10]}$$

$$\frac{1}{\sigma^2}(1^T - j\theta^T)\Xi^H \Xi (1 + j\theta) + \frac{1}{2}\phi^T \Phi^{-1} \phi + \frac{1}{2}\theta^T \Theta^{-1} \theta$$

If Equation 10 is partially differentiated with respect to $\theta$, the processor 134 can obtain $\hat{\theta}_{MAP}$ according to the following Equation 11.

$$\hat{\theta}_{MAP} = \left( \text{Re}\{\Xi^H \Xi\} + \frac{\sigma^2}{2}\Theta^{-1} \right)^{-1} (\text{Im}\{\Xi^H y\} - \text{Im}\{\Xi^H \Xi\}1) \quad \text{[Equation 11]}$$

Likewise, if Equation 10 is partially differentiated with respect to $\phi$, the processor can obtain $\hat{\phi}_{MAP}$ as shown in Equation 12.

$$\hat{\phi}_{MAP} = \left( \text{Re}\{\Lambda^H \Lambda\} + \frac{\sigma^2}{2}\Phi^{-1} \right)^{-1} (\text{Im}\{\Lambda^H y\} - \text{Im}\{\Lambda^H \Lambda\}1) \quad \text{[Equation 12]}$$

Meanwhile, in order to find the values of Equations 11 and 12, values of x, $\phi$, and $\theta$ are needed.

Therefore, the processor 134 may repeatedly and regressively compute relations for the phase noises of the transmission terminal and the receiving terminal and if an error value obtained from a result of the repeated computations is greater than an error value obtained from a previous repetition step, stop the repeated computations and output data obtained in the previous step. Details thereof will be described with reference to FIG. 5.

Figure 5:
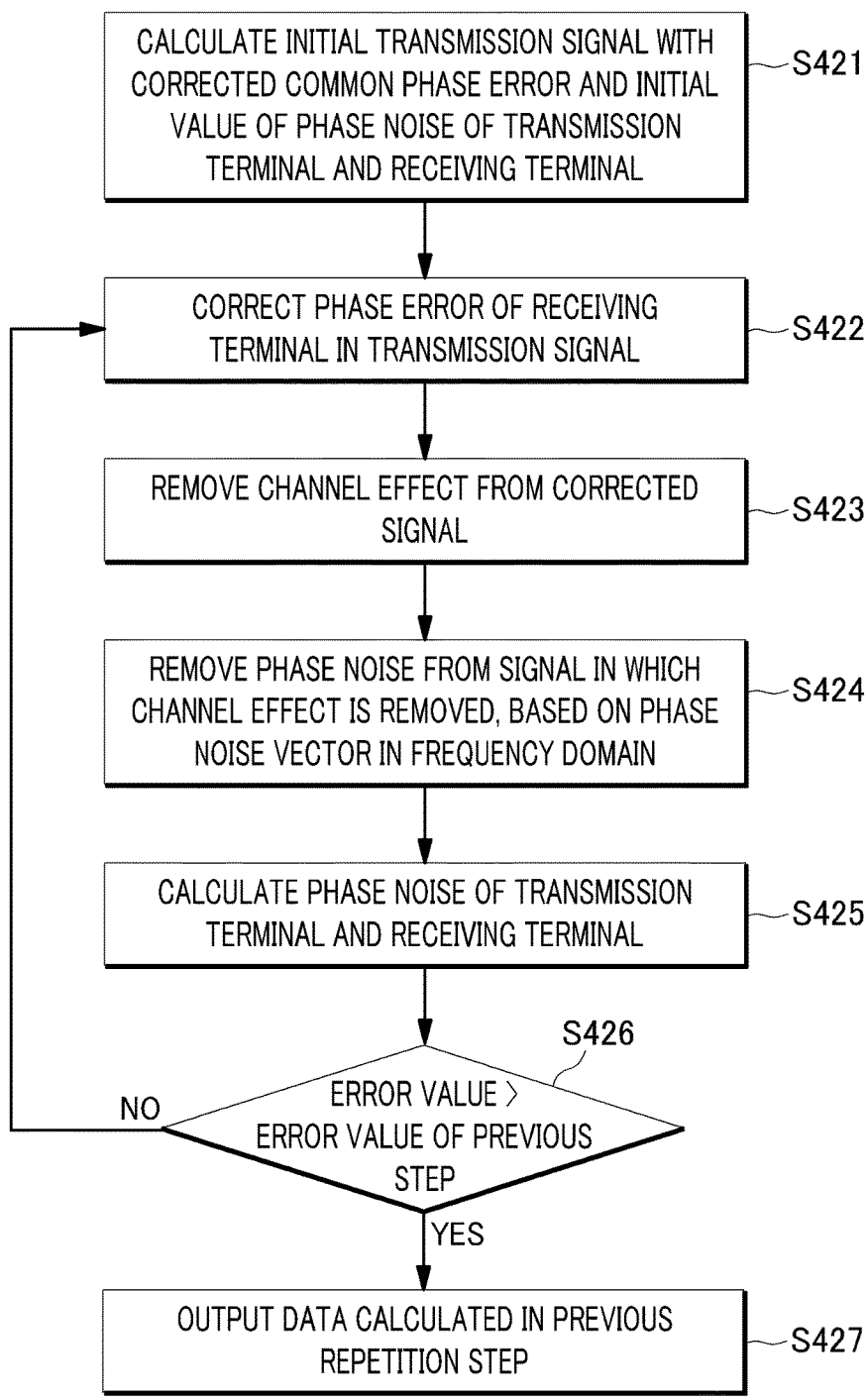
FIG. 5 is a flowchart provided to explain a detailed method of performing a regression computation algorithm by the processor illustrated in FIG. 3.

Referring to FIG. 5, the processor 134 may calculate initial values of the phase noises of the transmission terminal and the receiving terminal (S421).

Specifically, the processor 134 may calculate a common phase error using a least square algorithm and calculate an initial transmission signal $\tilde{x}^{(0)}$ in which the common phase error is corrected. Then, the processor 134 may substitute $\phi=0$ and $\tilde{x}^{(0)}$ in Equation 11 to calculate an initial value $\tilde{\theta}^{(0)}$ of the phase noise of the transmission terminal. Then, the processor 134 may substitute $\tilde{x}^{(0)}$ and $\tilde{\theta}^{(0)}$ in Equation 12 to calculate an initial value $\tilde{\phi}^{(0)}$ of the phase noise of the receiving terminal.

Then, the processor 134 may repeatedly and regressively compute relations for the phase noises of the transmission terminal and the receiving terminal on the basis of the calculated initial values.

Specifically, the processor 134 may multiply a received signal y of transmission data $\tilde{x}^{(k+1)}$ in a k+1th step by a phase noise $\tilde{\phi}^{*(k)}$ of a kth receiving terminal as shown in Equation 13 to correct a phase error of the receiving terminal (S422).

$$\tilde{y}^{(k+1)} = y \cdot \tilde{\phi}^{*(k)} \quad \text{[Equation 13]}$$

Then, the processor may perform DFT to the corrected received signal $\tilde{y}^{(k+1)}$ and then equalize a channel in a frequency domain to remove a channel effect (S423).

Meanwhile, if a signal obtained by performing channel equalization is defined as, this signal is from the frequency domain and thus affected by a phase noise of a transmission terminal. Therefore, the processor 134 may generate a circulant matrix using a phase noise vector $F\tilde{\theta}_i^{*(k)}$ in the frequency domain and then multiply $s_{i,eq}^{(k+1)}$ by the generated circulant matrix to restore data in which the effect of the phase noise of the transmission terminal is removed (S424). The above-described process can be expressed by the following Equations 14 and 15.

$$a_{\theta_i}^{(k)} = F\tilde{\theta}_i^{*(k)}, A_{\theta_i}^{(k)} = \text{circ}(a_{\theta_i}^{(k)}) \quad \text{[Equation 14]}$$

$$\tilde{s}_i^{(k+1)} = A_{\theta_i}^{(k)} s_{i,eq}^{(k+1)}, \tilde{x}_i^{(k+1)} = F\tilde{s}_i^{(k+1)} \quad \text{[Equation 15]}$$

The processor 134 may substitute the transmission signal $\tilde{x}_i^{(k+1)}$ and the phase noise $\tilde{\phi}^{(k+1)}$ of the receiving terminal obtained in the k+1th step through the above-described process in Equation 11 to calculate a phase noise $\tilde{\theta}^{(k+1)}$ of the transmission terminal and may substitute the transmission signal $\tilde{x}_i^{(k+1)}$ obtained in the k+1th step and the calculated phase noise $\tilde{\theta}^{(k+1)}$ of the transmission terminal in Equation 12 to calculate the phase noise $\tilde{\phi}^{(k+1)}$ of the receiving terminal (S425). In this case, the calculated transmission signal $\tilde{x}_i^{(k+1)}$ and the phase noises $\tilde{\phi}^{(k+1)}$ and $\tilde{\theta}^{(k+1)}$ and of the receiving terminal and the transmission terminal may be stored in the memory 133.

Meanwhile, the processor 134 may calculate an error value as an index of phase error correction in each repetition step and compare the error value with an error value obtained from a previous repetition step (S426). If the error value is smaller than the error value obtained from the previous repetition step, the processor 134 may repeatedly compute the above-described process (go to S422), and if the error value is greater than the error value obtained from the previous repetition step, the processor 134 may stop the repeated computations and output the data (i.e., transmission signal and phase noises of the transmission terminal and the receiving terminal) calculated in the previous repetition step (S426). For example, a k+1th error value $e^{(k+1)}$ may be calculated using a difference from a transmission signal $\tilde{x}^{(k+1)}$ obtained using a pilot subcarrier. This can be expressed by the following Equation 16.

$$e^{(k+1)} = \sum_{i=1}^{N_t} \sum_{q \in S_p} \|\tilde{s}_i(q) - s_i(q)\|^2 \quad \text{[Equation 16]}$$

In the above equation, $S_p$ represents a set of pilot subcarrier indices. An outline of the above-described regression computation algorithm is as shown in FIG. 6.

Meanwhile, the above-described algorithm is repeated using an initial value. Therefore, a reduction of number of times of repetition by accurately setting an initial value may affect a reduction of algorithm complexity.

Therefore, the processor 134 may further perform an operation for more accurately setting an initial value. That is, in the algorithm described in FIG. 4 and FIG. 5, the processor 134 corrects a common phase error and calculates an initial transmission signal $\tilde{x}^{(0)}$ and then assumes $\phi=0$ to estimate an initial value $\tilde{\theta}^{(0)}$ of the phase noise of the transmission terminal. However, in an actual environment, the initial transmission signal $\tilde{x}^{(0)}$ includes an inter-carrier interference caused by the phase noise of the receiving terminal. That is, it is very unlikely that the phase noise of the receiving terminal is 0.

In this case, the effect of the phase noise can be expressed by the following Equation 17.

$$y_j = \alpha_{\phi_j} F^H \sum_{i=1}^{N_t} \alpha_{\theta_i} H_{ji,D} s_i + \quad \text{[Equation 17]}$$

$$F^H \tilde{A}_{\phi_j} \sum_{i=1}^{N_t} \alpha_{\theta_i} H_{ji,D} s_i + P_{\phi_j,D} F^H \sum_{i=1}^{N_t} H_{ji,D} \tilde{A}_{\theta_i} s_i + w_j$$

In the above equation, $\alpha_{\theta_i}$ and $\alpha_{\phi_j}$ represent common phase errors generated by phase noises of an ith transmission terminal and a jth receiving terminal, respectively. Further, and $\tilde{A}_{\theta_i}$ and $\tilde{\Lambda}_{\theta_i}$ represent matrices in which diagonal components of original matrices $A_{\theta_i}$ and are removed, respectively.

Meanwhile, a common phase error in the first term of Equation 17 can be compensated through a common phase error correction algorithm. For example, a common phase error means that the same phase error is generated in all of subcarriers, and, thus, as described above, the common phase error can be estimated by finding a solution of a least square problem using a pilot in an OFDM symbol.

Inter-carrier interferences caused by phase noises appear as the second term and the third term. These terms represent inter-carrier interferences caused by phase noises of a receiving terminal and a transmission terminal, respectively. Therefore, the inter-carrier interferences in Equation 17 can be simplified as shown in the following Equation 18.

$$y_j = \alpha_{\phi_j} F^H \sum_{i=1}^{N_t} \alpha_{\theta_i} H_{ji,D} s_i + \epsilon_{rx} + \epsilon_{tx} + w_j \quad \text{[Equation 18]}$$

In the above equation, $\epsilon_{rx}$ represents an inter-carrier interference caused by a phase noise of a receiving terminal and $\epsilon_{tx}$ represents an inter-carrier interference caused by a phase noise of a transmission terminal.

That is, in order to more accurately calculate an initial value $\tilde{\theta}^{(0)}$ of the phase noise of the transmission terminal, the processor 134 needs to consider the inter-carrier interference $\epsilon_{rx}$ caused by the phase noise of the receiving terminal. To this end, the processor 134 may calculate a covariance matrix of $\epsilon_{rx}$. The covariance matrix can be calculated according to the following Equations 19 to 21.

$$C_{\epsilon_{rx}} = E[\epsilon_{rx} \epsilon_{rx}^H] \quad \text{[Equation 19]}$$

$$= \sum_{i=1}^{N_t} D \circ E[\tilde{p}_{\phi_j} \tilde{p}_{\phi_j}^H]$$

In the above equation, $\tilde{p}_{\phi_j}$ represents a remainder vector obtained by subtracting an average value from a vector and $\tilde{P}_{\phi_j,D}$ and represent matrices converted into diagonal matrices. Meanwhile, D can be expressed by the following Equation 20.

$$D = F^H(E_s I \circ E[h_{ji} h_{ji}^H]) \quad \text{[Equation 20]}$$

Meanwhile, in Equation 19, if $(\Phi_j)_{l,k} = \sigma_\phi^2 \min(l,k)$ according to a Wiener process assumption for formula analysis, $E[\tilde{p}_{\phi_j} \tilde{p}_{\phi_j}^H]$ can be calculated according to the following Equation 21.

$$E[\tilde{p}_{\phi_j} \tilde{p}_{\phi_j}^H] = \quad \text{[Equation 21]}$$

$$\frac{\sigma_\phi^2}{6N}[3b^2 - 3(2N+1)b + 3a^2 - 3a + 2N^2 + 3N + 1]$$

Therefore, the processor 134 may more accurately calculate an initial value $\tilde{\theta}^{(0)}$ of the phase noise of the transmission terminal according to the following Equation 22 having $\epsilon_{rx}$ as a noise by modifying the above-described MAP estimation method in order to use the covariance matrix of $\epsilon_{rx}$ calculated according to Equations 19 to 21.

$$\tilde{\theta}^{(0)} = (Re\{\Xi^H(\sigma^2 I + C_{\epsilon_{rx}})\Xi\} + \frac{1}{2}\Theta^{-1})^{-1}(Im\{\Xi^H(\sigma^2 I + C_{\epsilon_{rx}}) y\} - Im\{\Xi^H(\sigma^2 I + C_{\epsilon_{rx}})\Xi\}1) \quad \text{[Equation 22]}$$

As described above, in the disclosed example, an initial value needs to be obtained without knowing a phase noise of a receiving terminal. Thus, a phase noise of a transmission terminal is calculated in consideration of an interference generated in the presence of a phase noise of a receiving terminal. Therefore, it is possible to more accurately estimate an initial value.

Further, in an additional example, the processor 134 may use interpolation to reduce complexity in computing an inverse matrix. For example, the processor 134 may reduce the size of the existing inverse matrix by M/N times by using an interpolation matrix with a size of N×M (N>M). Thus, Equations 11 and 12 can be expressed as the following Equations 23 and 24.

$$\hat{\theta}_{MAP} = \quad \text{[Equation 23]}$$

$$\left(Re\{G^H \Xi^H \Xi G\} + \frac{\sigma^2}{2}\tilde{\Theta}^{-1}\right)^{-1}(Im\{G\Xi^H y\} - Im\{G^H \Xi^H \Xi G\}1)$$

$$\hat{\phi}_{MAP} = \left(Re\{G^H \Lambda^H \Lambda G^H\} + \frac{\sigma^2}{2}\tilde{\Phi}^{-1}\right)^{-1} \quad \text{[Equation 24]}$$

$$(Im\{G^H \Lambda^H y\} - Im\{G^H \Lambda^H \Lambda G^H\}1)$$

In Equations 23 and 24, $\tilde{\Theta}$ and $\tilde{\Phi}$ represent covariance matrices of an interpolated phase noise and can be induced as long as an original value is known.

Meanwhile, phase error correction performance as a result of mitigation of a phase noise through the MIMO system 100 will be described below with reference to FIG. 7 and FIG. 8.

Figure 7:
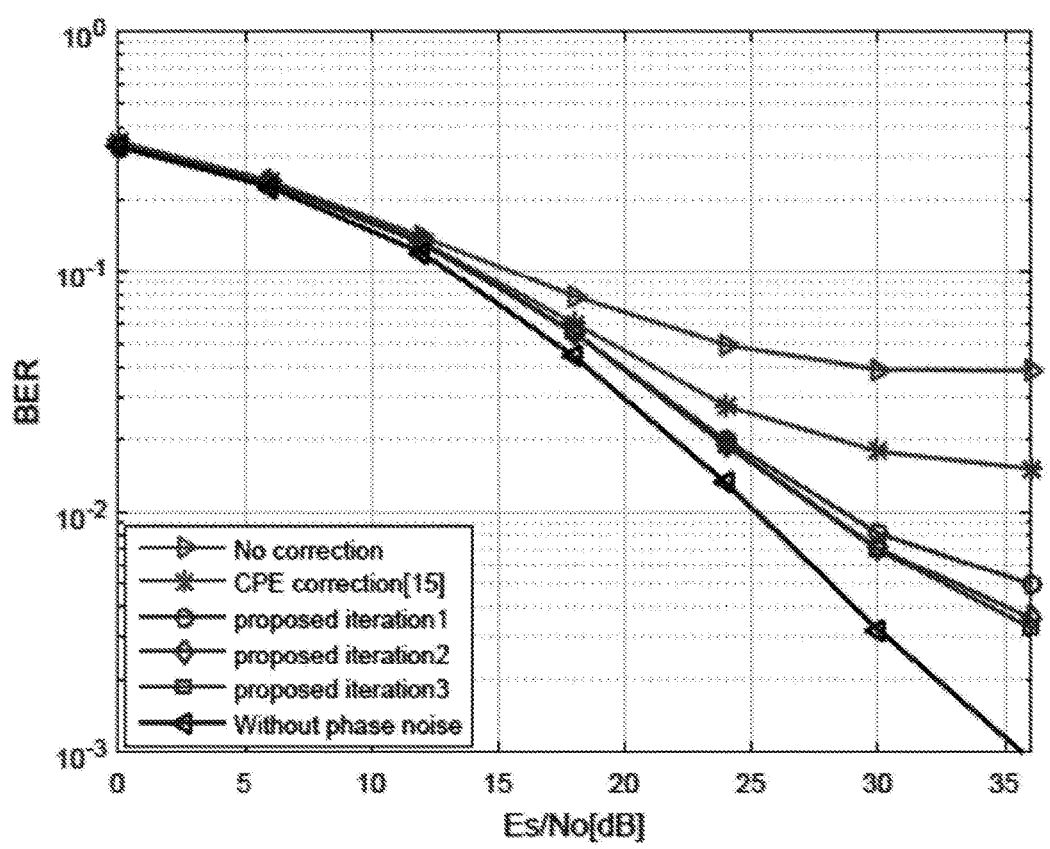
FIG. 7 is a graph showing common phase error correction in a 2×2 MIMO system.
Figure 8:
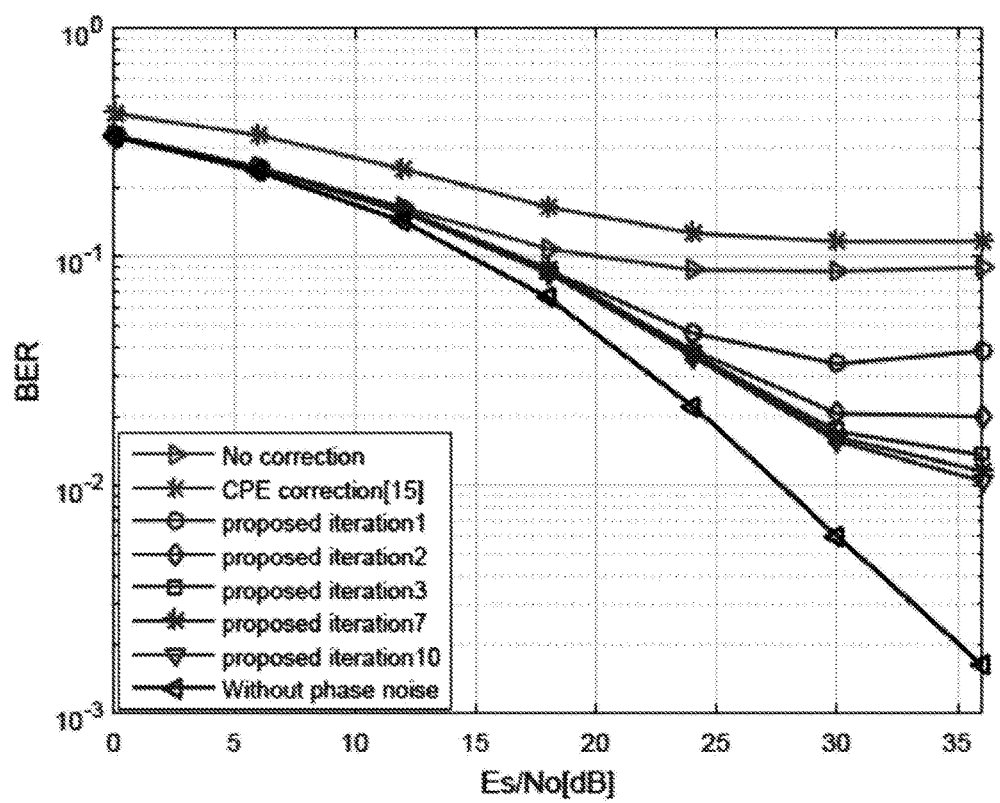
FIG. 8 is a graph showing common phase error correction in a 5×5 MIMO system.

FIG. 7 is a graph showing phase error correction in a 2×2 MIMO system, and FIG. 8 is a graph showing phase error correction in a 5×5 MIMO system.

As described above, in FIG. 7 and FIG. 8, a BER (bit error rate) according to a phase error correction algorithm of the present solution and BER (bit error rate) according to a conventional common phase error correction algorithm are compared. Herein, as simulation conditions of a phase noise mitigation process of the MIMO system 100, a system including 2×2 antennas and a system including 5×5 antennas are used. Further, OFDM (FFT size: 64, pilot subcarrier: 16) and 16 QAM are used as modulation systems and Wiener Process $2\pi\beta T_s = 5 \times 10^{-3} (rad)^2$ is used as a phase noise model.

As such, the MIMO system 100 repeatedly estimate a phase noise and thus can restore an initial transmission signal more accurately than a conventional technology in which only a common phase error is corrected. Therefore, the performance can be greatly improved.

As described above, the MIMO system 100 mathematically finds phase noises of a transmission terminal and a receiving terminal on the basis of a result of mathematical modeling of a system model in a state where an independent phase noise is present in each antenna stage. Further, the MIMO system 100 repeatedly processes a circulant algorithm and thus can greatly improve phase error correction performance as compared to the conventional technology in which only a common phase error is corrected. Furthermore, if the number of pilots is greater than the number of antennas, it is possible to achieve good enough performance in a multiple-antenna system including 2×2 antennas.

The phase noise mitigation method using the MIMO system in which each antenna has an independent oscillator can be embodied in a storage medium including instruction codes executable by a computer such as a program module executed by the computer. Besides, the data structure can be stored in the storage medium executable by the computer. A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as computer-readable instruction code, a data structure, a program module or other data.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

We claim:

1. A phase noise mitigation method using a MIMO(multi-input multi-output) system in which each antenna has an independent oscillator, comprising:

receiving a transmission signal transmitted from a transmitting antenna, through a receiving antenna and an oscillator;

estimating multiple parameters for a phase noise of a transmission terminal and a phase noise of a receiving terminal on the basis of a result of mathematical modeling of signals transmitted and received through the MIMO system in which each antenna has an independent oscillator; and mitigating phase noises of the transmission terminal and the receiving terminal which are estimated from the received signal, wherein the estimating of multiple parameters includes:

repeatedly and alternately computing relations for the phase noises of the transmission terminal and the receiving terminal; and if an error value obtained from a result of the repeated computations is greater than an error value obtained from a previous repetition step, stopping the repeated computations and outputting data calculated in the previous repetition step.

2. The phase noise mitigation method of claim 1, wherein the mathematical modeling of the MIMO system includes setting a log likelihood function corresponding to the phase noises of the transmission terminal and the receiving terminal and performing partial differentiation to each of parameters to be estimated in the log likelihood function on the basis of a maximum A posterior (MAP) estimation method.

3. The phase noise mitigation method of claim 2, wherein the log likelihood function corresponding the phase noises is expressed by the following Equation 1 including parameters of the phase noise of the transmission terminal and the phase noise of the receiving terminal:

$$L(\phi, \theta) = \frac{1}{\sigma^2} y^H y - \frac{2}{\sigma^2} \text{Re}\{(1^T - j\theta^T) \Xi^H y\} + \frac{1}{\sigma^2}(1^T - j\theta^T)\Xi^H \Xi(1 + j\theta) + \frac{1}{2}\phi^T \Phi^{-1} \phi + \frac{1}{2}\theta^T \Theta^{-1} \theta,$$

$$(\Xi = P_{\phi,D} F_{N_r,D}^H H F_{N_r,D} X_D)$$

[Equation 1]

wherein $\phi$ represents a phase noise of a transmission terminal, $\theta$ represents a phase noise of a receiving terminal, $\Phi$ represents a covariance matrix of the phase noise of the transmission terminal, $\Theta$ represents a covariance matrix of the phase noise of the receiving terminal, j represents an identification number of a receiving antenna, y represents a transmission signal, $X_D$ represents a diagonal matrix of a data vector x, $P_{\theta,D}$ is a diagonal matrix of $P_\theta = \exp\{j\theta\}$, F represents a normalized DFT matrix, and H represents $$H = \begin{bmatrix} H_{11,D} & H_{12,D} & \cdots & H_{1N_t,D} \\ H_{21,D} & H_{22,D} & \cdots & H_{2N_t,D} \\ \vdots & \vdots & \ddots & \vdots \\ H_{N_r1,D} & H_{N_r2,D} & \cdots & H_{N_rN_t,D} \end{bmatrix}$$

(where represents a diagonal matrix of each channel), $N_r$, D represents a diagonal matrix of antenna numbers of the receiving terminal, $N_t$, D represents a diagonal matrix of antenna numbers of the transmission terminal.

4. The phase noise mitigation method of claim 1, wherein the repeatedly and alternately computing of relations for the phase noises of the transmission terminal and the receiving terminal includes:

calculating a common phase error using a least square algorithm and calculating an initial transmission signal in which the common phase error is corrected and calculating an initial value of the phase noises of the transmission terminal and the receiving terminal; and repeatedly performing a process of calculating a received signal of a next repetition step in which a phase error of the receiving terminal is corrected on the basis of the initial value of the phase noises of the transmission terminal and the receiving terminal, removing a channel effect by channel equalization to the received signal of the next repetition step in a frequency domain, and removing a phase noise in a frequency domain from a result of the removal of the channel effect to restore a transmission signal of the next repetition step.

5. The phase noise mitigation method of claim 4, wherein the initial value of the phase noise of the transmission terminal is a solution obtained by substituting the initial transmission signal in which the common phase error is corrected and $\phi=0$ in the following Equation 2, and the initial value of the phase noise of the receiving terminal is a solution obtained by substituting the initial transmission signal in which the common phase error is corrected and the solution of Equation 2 in the following Equation 3:

$$\hat{\theta}_{MAP} = \left(Re\{\Xi^H\Xi\} + \frac{\sigma^2}{2}\Theta^{-1}\right)^{-1}(Im\{\Xi^Hy\} - Im\{\Xi^H\Xi\}1), \quad [\text{Equation 2}]$$

$$(\Xi = P_{\phi,D}F_{N_r,D}^H HF_{N_t,D}X_D)$$

$$\hat{\phi}_{MAP} = \left(Re\{\Lambda^H\Lambda\} + \frac{\sigma^2}{2}\Phi^{-1}\right)^{-1}(Im\{\Lambda^Hy\} - Im\{\Lambda^H\Lambda\}1), \quad [\text{Equation 3}]$$

$$(\Lambda = \text{diag}(F_{N_r,D}^H HF_{N_t,D}P_{\theta,D}x))$$

wherein $\phi$ represents a phase noise of a transmission terminal, $\theta$ represents a phase noise of a receiving terminal, $\Phi$ represents a covariance matrix of the phase noise of the transmission terminal, $\Theta$ represents a covariance matrix of the phase noise of the receiving terminal, $X_D$ represents a diagonal matrix of a data vector x, $P_{\theta,D}$ is a diagonal matrix of $P_\theta=\exp\{j\theta\}$, F represents a normalized DFT matrix, and H represents $$H = \begin{bmatrix} H_{11,D} & H_{12,D} & \cdots & H_{1N_t,D} \\ H_{21,D} & H_{22,D} & \cdots & H_{2N_t,D} \\ \vdots & \vdots & \ddots & \vdots \\ H_{N_r1,D} & H_{N_r2,D} & \cdots & H_{N_rN_t,D} \end{bmatrix}$$

(where $H_{ij,D}$ represents a diagonal matrix of each channel), $N_r,D$ represents a diagonal matrix of antenna numbers of the receiving terminal, $N_t,D$ represents a diagonal matrix of antenna numbers of the transmission terminal, diag is an operator that converts a vector into a diagonal matrix and also converts matrices having the same size into a block diagonal matrix and $P_{\theta,D}=\text{diag}(P_\theta)(P_\theta=\exp\{j\theta\})$.

6. The phase noise mitigation method of claim 5, wherein the initial value of the phase noise of the transmission terminal is a solution of the following Equation 4 considering the initial transmission signal in which the common phase error is corrected and an inter-carrier interference caused by the phase noise of the receiving terminal:

$$\tilde{\theta}^{(0)}=(Re\{\Xi^H(\sigma^2I+C_{\epsilon_{rx}}\Xi\}+\tfrac{1}{2}\Theta^{-1})^{-1}(Im\{\Xi^H(\sigma^2I+C_{\epsilon_{rx}})y\}-Im\{\Xi^H(\sigma^2I+C_{\epsilon_{rx}})\Xi\}1) \quad [\text{Equation 4}]$$

wherein I represents a vector consisting of 1, $Re\{A\}$ represents an operator that extracts only a real number part of A, $\sigma^2$ represents a noise variance, $\tilde{\theta}^{(0)}$ represents an initial value of a phase noise of a receiving terminal, $\Theta$ represents a covariance matrix of the phase noise of the receiving terminal, $\epsilon_{rx}$ represents an inter-carrier interference, and $C_{\epsilon_{rx}}$ represents a covariance matrix of $\epsilon_{rx}$.

7. The phase noise mitigation method of claim 1, wherein the error value is a difference between a result value of the repeated computations and a value obtained using a pilot subcarrier.

8. The phase noise mitigation method of claim 1, wherein the estimating of multiple parameters includes reducing the number of times of repetition by using an interpolated matrix.

9. A MIMO(multi-input multi-output) system in which each antenna has an independent oscillator, comprising:
multiple receiving antennas;
multiple oscillators connected to the multiple receiving antennas, respectively;
a memory configured to store a program for mitigating phase noises of a receiving terminal and a transmission terminal from a signal received through a receiving antenna and an oscillator; and
a processor configured to execute the program,
wherein upon execution of the program, the processor estimates multiple parameters for a phase noise of a transmission terminal and a phase noise of a receiving terminal on the basis of a result of mathematical modeling of signals transmitted and received through the MIMO system and mitigates phase noises of the transmission terminal and the receiving terminal which are estimated from the signal received through the receiving antenna and the oscillator, and
the estimation of multiple parameters is performed by repeatedly and alternately computing relations for the phase noises of the transmission terminal and the receiving terminal, and if an error value obtained from a result of the repeated computations is greater than an error value obtained from a previous repetition step, stopping the repeated computations and outputting data calculated in the previous repetition step.

10. A non-transitory computer-readable recording medium having recorded thereon a program for performing the method of claim 1 on a computer.

* * * * *